Figure 16:
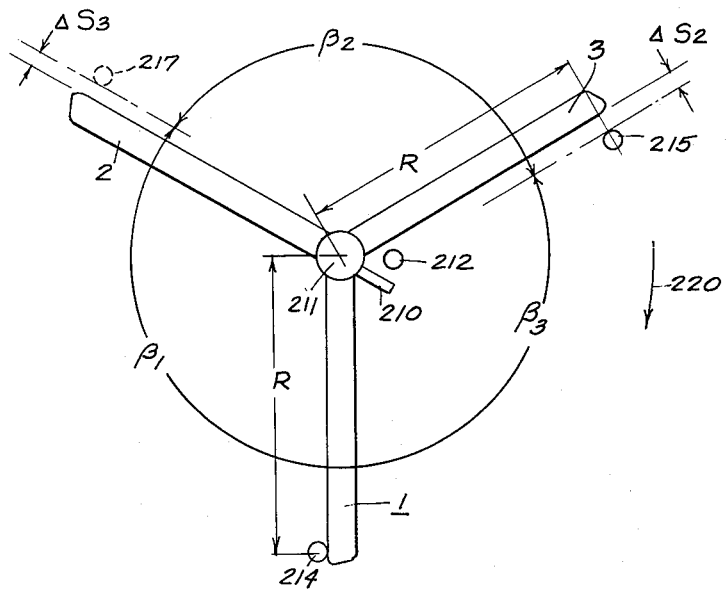

Oct. 3, 1961 S. P. WILLITS ET AL 3,002,420
PARALLAX INTERVAL SENSING DEVICE
Filed April 23, 1958 9 Sheets-Sheet 1
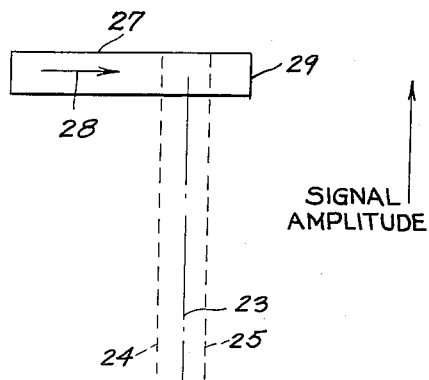
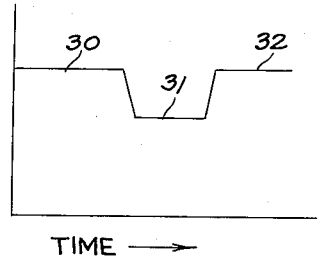
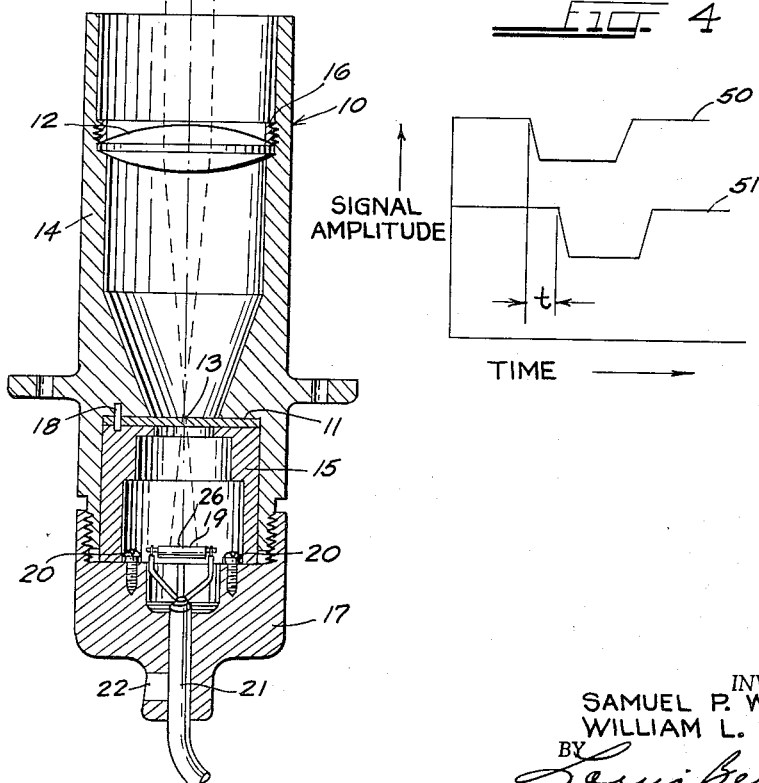
INVENTORS:
SAMUEL P. WILLITS
WILLIAM L. MOHAN

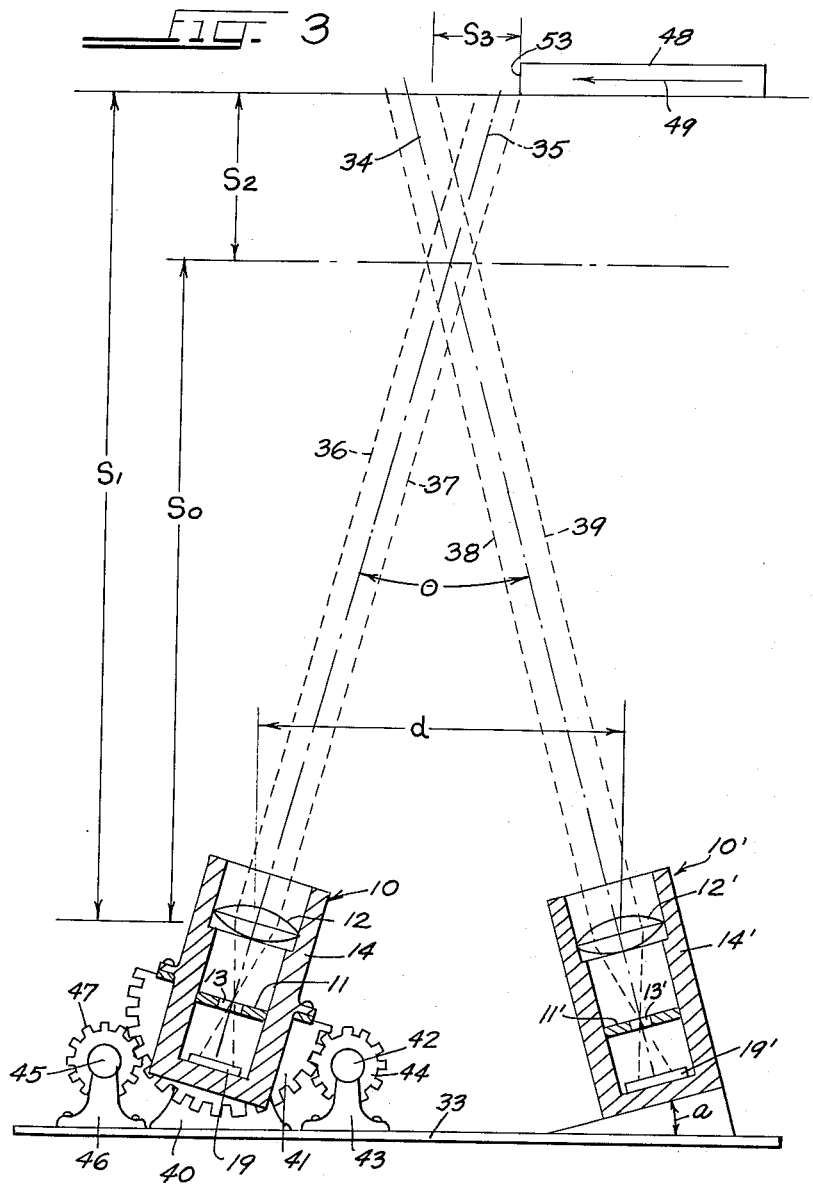

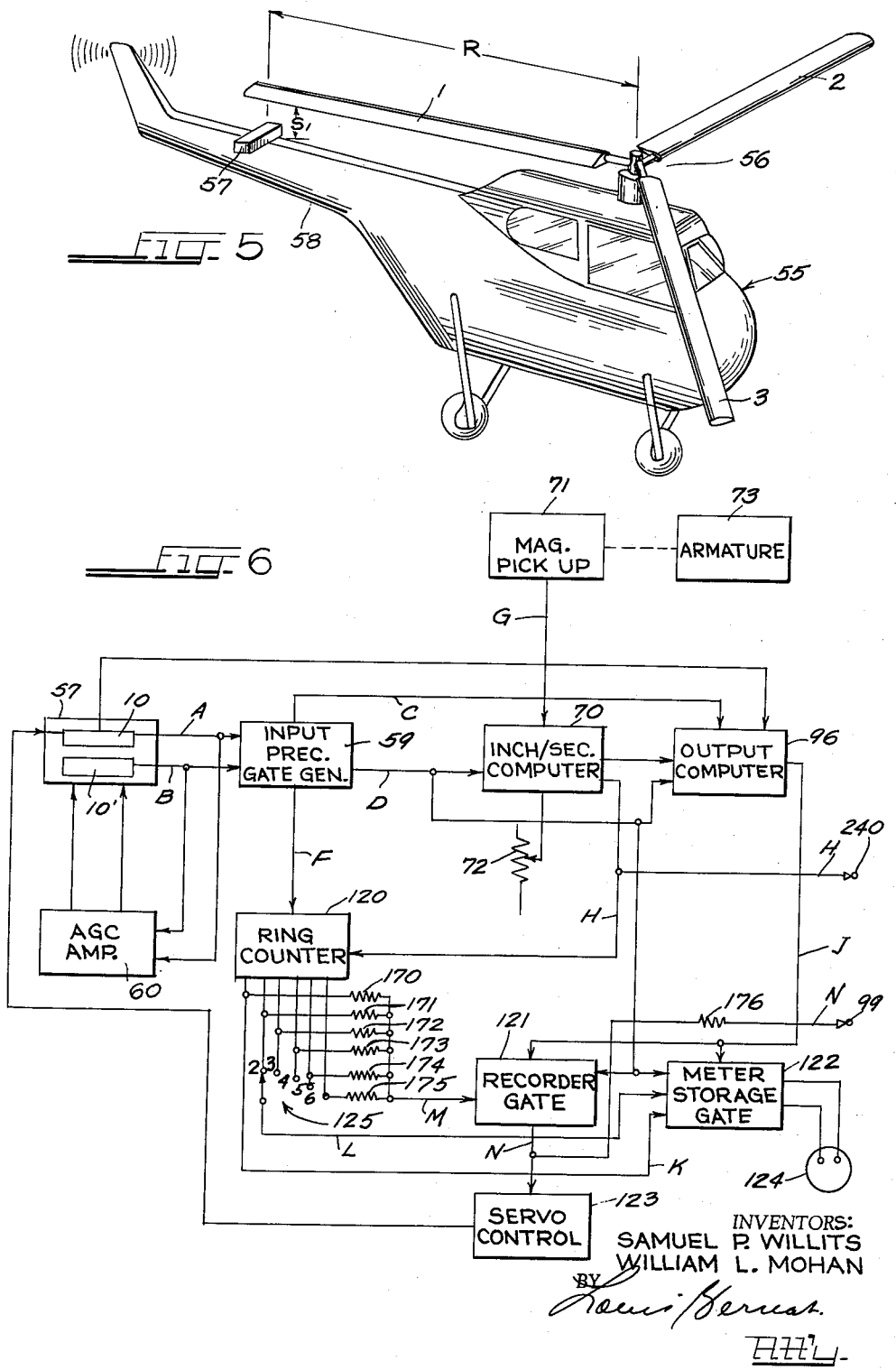

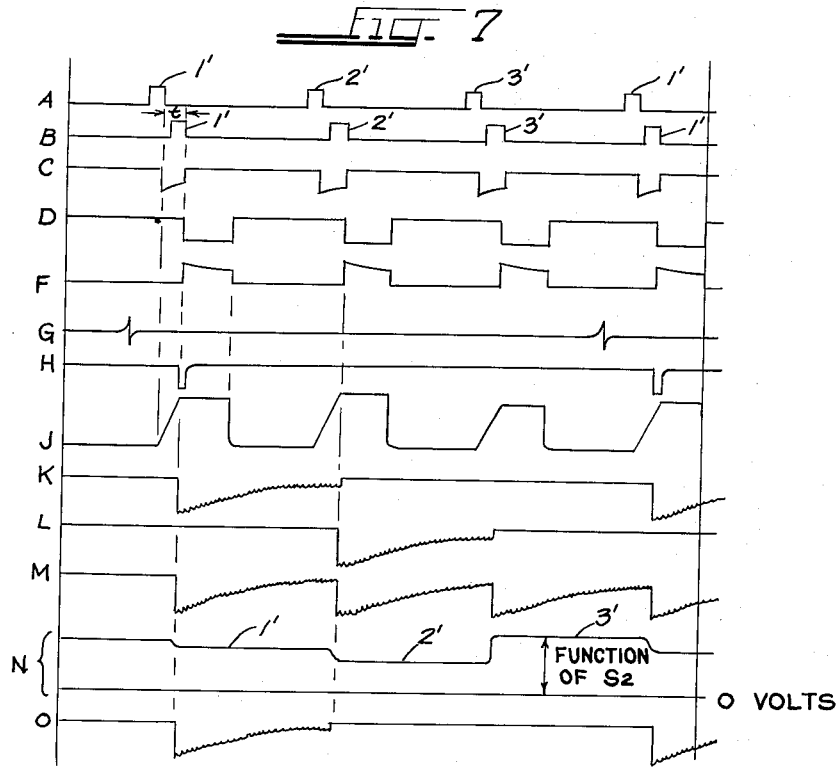

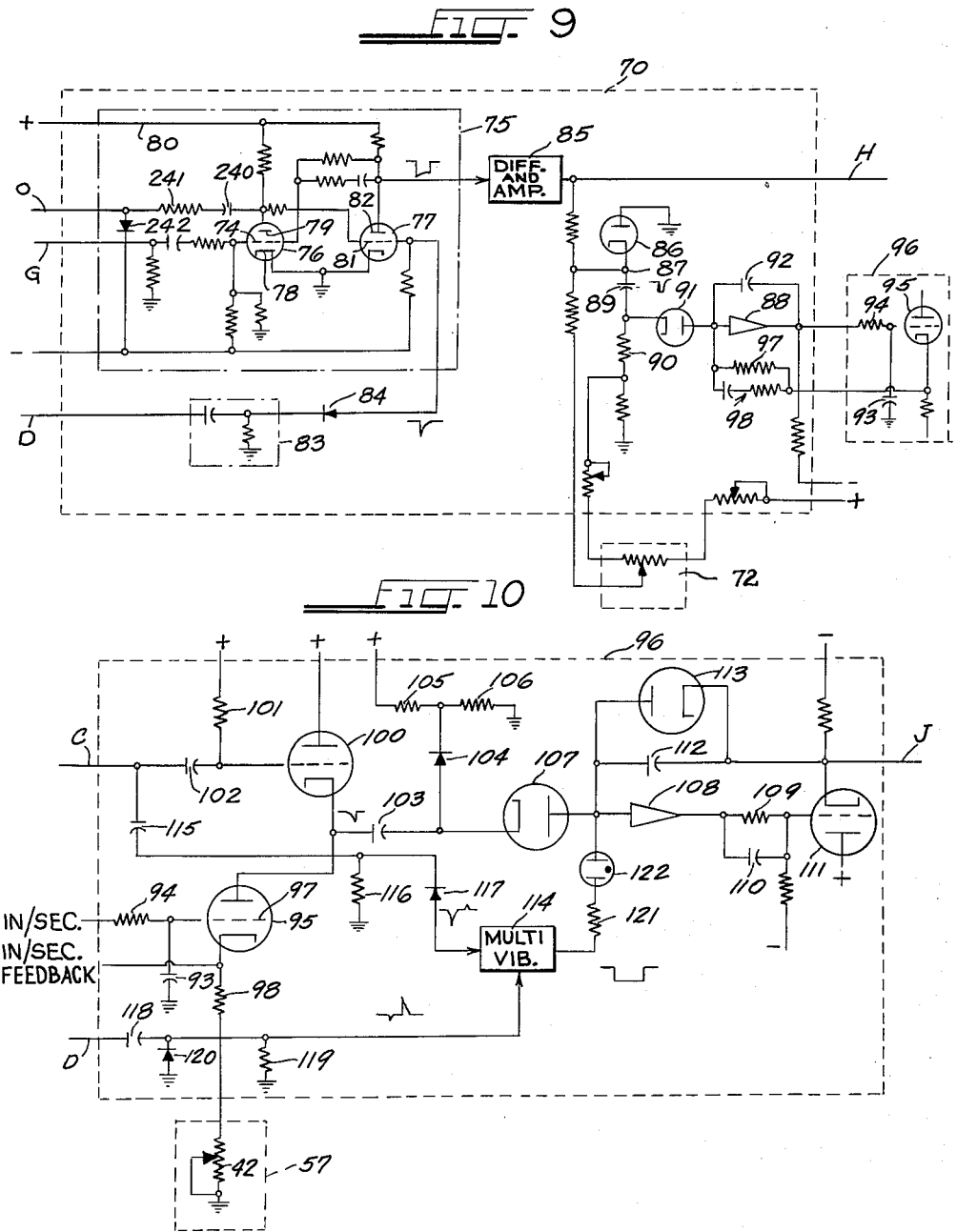

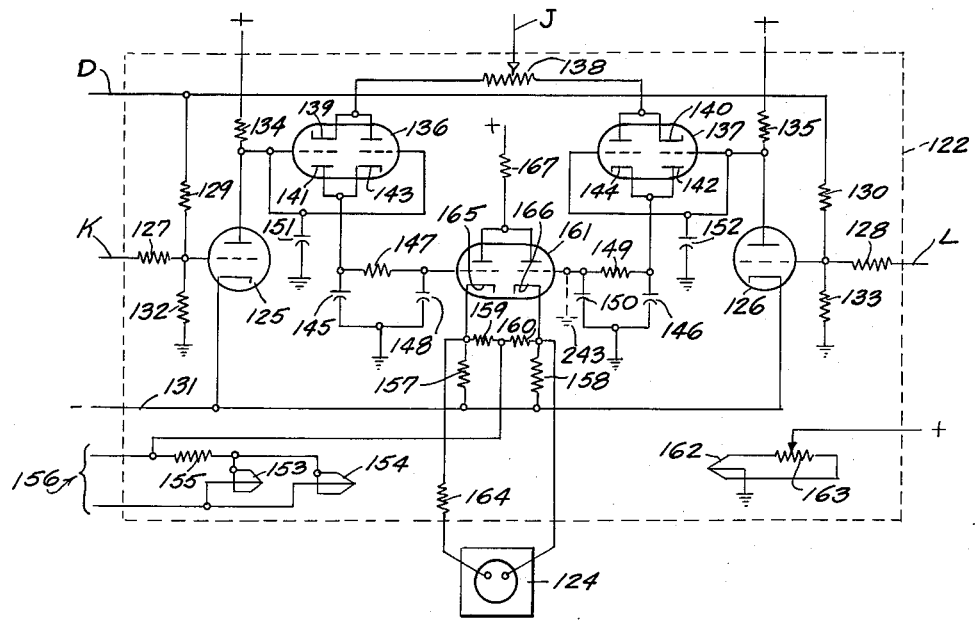

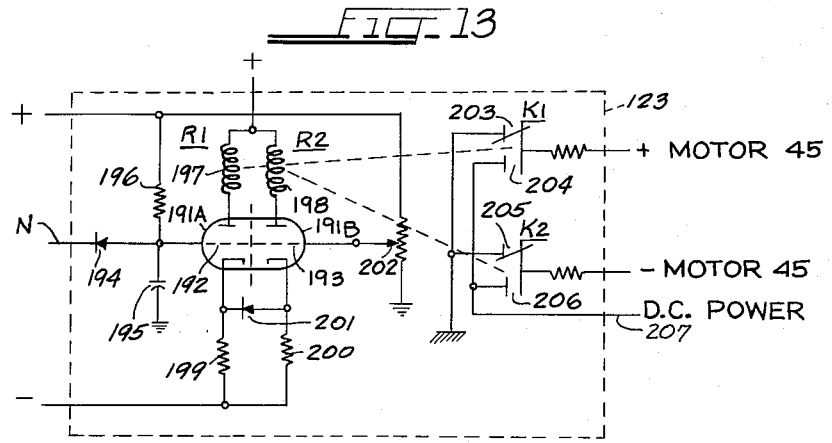
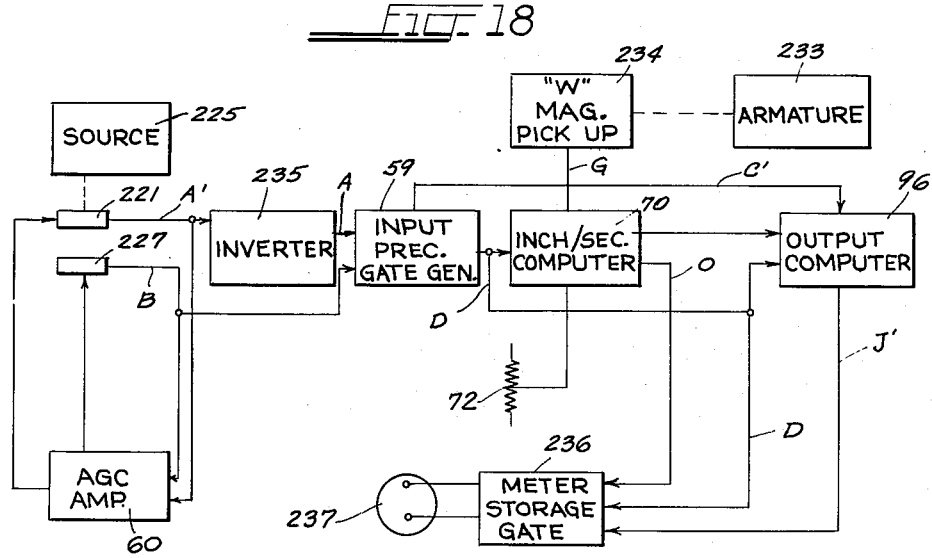

Oct. 3, 1961  S. P. WILLITS ET AL  3,002,420
PARALLAX INTERVAL SENSING DEVICE
Filed April 23, 1958                                              9 Sheets-Sheet 8
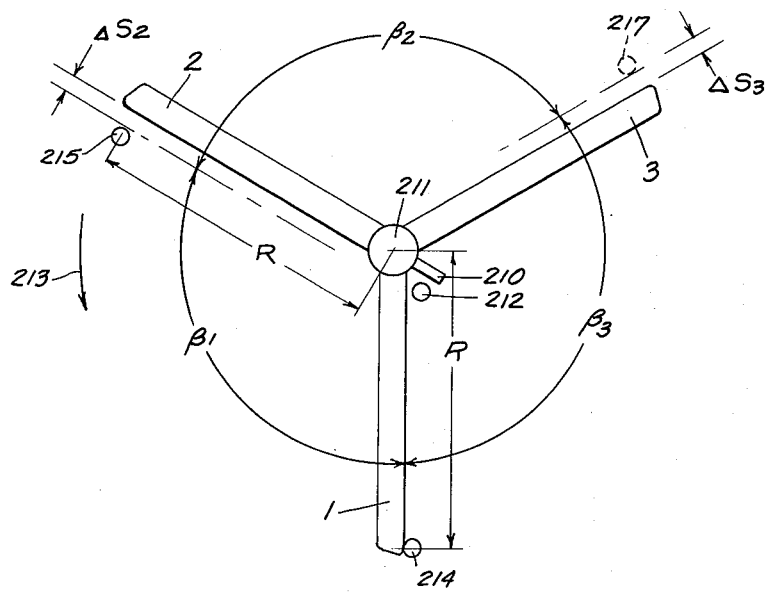
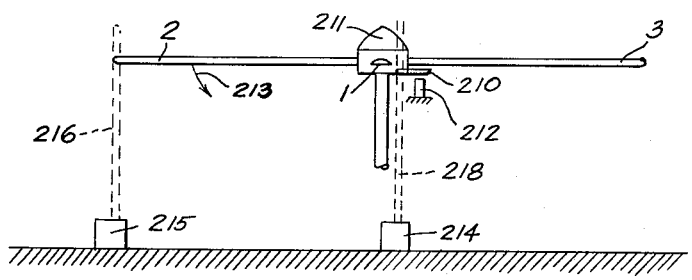
INVENTORS:
SAMUEL P. WILLITS
WILLIAM L. MOHAN Oct. 3, 1961 S. P. WILLITS ET AL 3,002,420
PARALLAX INTERVAL SENSING DEVICE
Filed April 23, 1958 9 Sheets-Sheet 9

INVENTORS:
SAMUEL P. WILLITS
WILLIAM L. MOHAN
BY

United States Patent Office 3,002,420
Patented Oct. 3, 1961

3,002,420
PARALLAX INTERVAL SENSING DEVICE
Samuel P. Willits, Mount Prospect, and William L. Mohan, Prospect Heights, Ill., assignors, by mesne assignments, to Chicago Aerial Industries, Inc., Melrose Park, Ill., a corporation of Delaware
Filed Apr. 23, 1958, Ser. No. 730,480
19 Claims. (Cl. 88—14)

This invention relates generally to improvements in parallax interval sensing and more particularly to new and improved apparatus for measuring the relative spatial positions of one or more objects rotating with respect to a common plane of reference.

This invention is a continuation-in-part of our co-pending application, Serial No. 561,485, filed January 26, 1956, which discloses the combination of optical apparatus for sensing a parallax interval for objects in motion and electronic circuitry responsive to the signals supplied by the optical means for providing a measurement of the relative distances of velocities of such objects. When such objects in motion comprise a group of objects rotating at or near a common plane of reference, as for example, turbine buckets, propeller tips, helicopter blades, and the like, the optical apparatus and electronic circuitry further serves to compare relative spatial positions of the rotating objects and to provide indications thereof.

As more fully described in our co-pending application, the optical apparatus defines a pair of ray bundles having a determinable parallax angle therebetween, which ray bundles are adpted to impinge upon radiation sensitive means for generating electric signals corresponding to the blocking of the ray bundles by the objects moving in their track path therethrough. These electric signals are applied to the electronic circuitry for a determination of the desired information, such as the parallax intervals of transit of the objects, the velocity of the objects, the distance of the objects from the radiation sensitive means, the relative track positions of successive objects, any changes in axial position for a group of objects, and so on, all without physical contact between the moving objects and the sensing and measuring apparatus.

It is a general object of this invention to provide new and improved parallax interval sensing apparatus for measuring the relative spatial positions of moving objects.

More specifically, it is one object of this invention to provide novel electronic circuitry in parallax interval sensing apparatus which provides a comparison signal indicative of the deflection of rotating objects, either with respect to each other, or individually with respect to a reference such as a hub.

It is another object of this invention to provide novel electronic circuitry, as described above, which provides such a comparison signal without necessitating physical contact between the rotating objects and the sensing apparatus, or the hub.

It is still another object of this invention to provide novel electronic circuitry, as described above, which utilizes a servo system for reducing the importance of vibrational disturbances of the optical sensing apparatus and for reducing errors in the determination of velocity, thereby increasing the sensitivity of spatial measurement of said rotating objects.

It is a further object of this invention to provide novel parallax interval sensing apparatus comprising a pair of spaced optical sensing devices and electronic circuitry including a servo system responsive to the signals from said optical sensing devices for adjusting the angular relationship of said sensing devices to maintain a selected characteristic of said signals within a predetermined range of values with a resulting increase in accuracy and sensitivity of said apparatus.

It is a still further object of this invention to provide an improved electronic measuring circuit for parallax interval sensing apparatus, which circuit includes novel inch-per-second computing means for producing signals representative of the velocity of the moving objects being measured.

It is a still further object of the invention to provide new and improved parallax interval sensing apparatus for measuring characteristics of rotating objects which comprises novel means for determining the relative lag distances of the elements of rotating machinery.

It is still another object of this invention to provide new and improved parallax interval sensing apparatus for measuring characteristics of rotating objects which comprises novel means for determining the absolute lag distance of a single rotating element with respect to its hub.

With these and other objects in view, the invention consists in the construction, arrangement and combination of the various parts of the novel parallax interval sensing apparatus, whereby the objects contemplated are attained as hereinafter set forth. The various features of novelty which characterize this invention are pointed out with particularly in the claims appended to and forming a part of this specification. For a better understanding of the invention and its advantages, reference is had to the accompanying drawing and descriptive matter in which are illustrated and described several illustrative embodiments of the invention.

Figure 17:
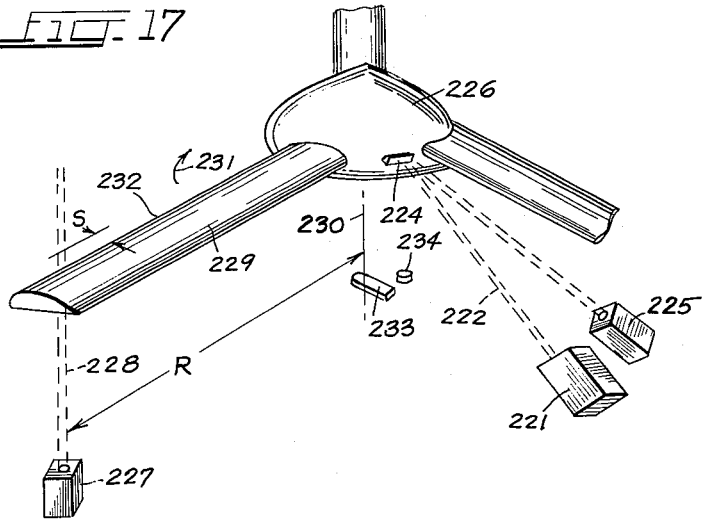

In the drawing:
FIGURE 1 is a side elevational view, in cross-section, of an illustrative optical sensing device embodied in the invention;
FIGURE 2 is a signal amplitude vs. time plot of the electrical signal output obtainable from the optical sensing device of FIGURE 1;
FIGURE 3 is a cross-sectional view of one embodiment of optical sensing system utilized in the invention;
FIGURE 4 is a signal amplitude vs. time plot of the electrical signal output obtainable from the system of FIGURE 3;
FIGURE 5 illustrates the invention as advantageously used to determine blade height in a helicopter;
FIGURE 6 is a block diagram of the electronic circuitry forming part of the invention when used as shown in FIGURE 5;
FIGURE 7 is a plot of the voltage waveforms present at various portions of the circuit of FIGURE 6;
FIGURE 8 is a block diagram of an input precision gate generator which may be used in the circuits of FIGURES 6 and 18;
FIGURE 9 is a schematic diagram of an inch per second computer which may be used in the circuits of FIGURES 6 and 18;
FIGURE 10 is a schematic diagram of an output computer which may be used in the circuits of FIGURES 6 and 18;
FIGURE 11 is a schematic diagram of a meter storage gate which may be used in the circuits of FIGURES 6 and 18;
FIGURE 12 is a schematic diagram of a recorder gate which may be used in the circuit of FIGURE 6;
FIGURE 13 is a schematic diagram of a servo control which may be used in the circuit of FIGURE 6;
FIGURE 14 is a plan view of an illustrative three bladed rotor and sensor arrangement which may be used to obtain relative blade lag distances;
FIGURE 15 is a view in side elevation of the rotor and sensor arrangement of FIGURE 14;

FIGURE 16 is a plan view of an illustrative three bladed rotor and sensor arrangement utilized to obtain relative blade lag distances when the rotor is revolved in the opposite direction to the rotor shown in FIGURE 14; and FIGURE 17 is a perspective view of a three bladed rotor and sensor arrangement utilized to obtain the absolute lag distance of a single element in a rotatable system; and FIGURE 18 is a block diagram of a circuit embodiment adapted for computing lag distances in a rotatable system of the type shown in FIGURE 17.

Referring now to the drawing, and more particularly to FIGURE 1 thereof, there is shown an illustrative optical sensor unit 10 which advantageously comprises an objective lens 12 retained in the upper end of housing 14 by the threaded lock ring 16. A disc of metal or other opaque material 11 containing therein an aperture 13 is retained at the focus of lens 12 by means of an assembly body 15, which in turn, is clamped by an end cap 17 threadedly engaged with housing 14. The disc 11 is prevented from lateral excursions by means of a dowel pin 18 which collaborates with a hole in the disc 11. Advantageously a radiation sensitive element, such as the photoelectric cell 19, is positioned within the housing 10 and is held in position by means of a retaining screw 20. Photo cell 19 has its terminals connected to the wires in the cable 21, which in turn, is held down by the clamp 22.

The construction of photocell 19 may take any form known in the art such as a photo-conductive type of cell including lead sulphide, cadmium sulphide, cadmium selenide or any other similar type. The photocell 19 also may be a variety of the barrier layer type, photo emissive type, N-P junction type or photo type of transistor. In accordance with an aspect of this invention, photo-multipliers are preferred due to their gain, sensitivity, frequency response and output capacities.

In the operation of the optical sensing unit 10 shown in FIGURE 1 of the drawing, light within the collimated ray bundle 23, which is defined by the ray lines 24 and 25, comes to a focus at aperture 13 of the disc 11 and impinges upon the photoelectric cell 19 at the point 26. Advantageously aperture 13 in disc 11 may be of circular shape but in accordance with other features of the invention aperture 13 may also be an elongated slit oriented at right angles to the direction of object transit. Those skilled in the art will further appreciate that while aperture 13 may be a hole in the disc 11, it also may take the form of a transparent or translucent area on an otherwise opaque disc.

When an opaque object 27, moving in the direction of arrow 28, crosses the ray bundle 23, the light is blocked from impinging upon the photoelectric cell 19 and accordingly an output signal indicative of this condition will result. This signal is graphically illustrated in FIGURE 2 of the drawing. The output signal of the photoelectric cell before the leading edge 29 of the opaque object 27 crosses the ray bundle has an amplitude represented at 30 in the curve of FIGURE 2. When the entire ray bundle 23 is blocked by the opaque object 27 the signal amplitude falls to the level indicated at 31, and when the opaque object passes the ray bundle 23, the signal rises to an amplitude indicated at 32 in the curve of FIGURE 2.

One preferred embodiment for effecting parallax interval sensing utilizing the optical sensing unit of FIGURE 1 is shown in FIGURE 3 of the drawing. In this embodiment, two sensing units 10 and 10' are employed, and advantageously each sensing unit is constructed in accordance with the optical sensing unit shown in FIGURE 1 of the drawing. Sensing units 10 and 10' are suitably secured to a mounting base 33 so that the optical axis 34 and 35 of lenses 12' and 12, respectively, are preferably coplanar and define the parallax angle $\theta$ therebetween. The optical axis 35 is associated with the collimated ray bundle defined by the ray lines 36 and 37, and optical axis 34 is associated with the collimated ray bundle defined by the ray lines 38 and 39.

As shown in FIGURE 3 of the drawing, the optical sensing unit 10' is secured to the mounting base 33 such that the angle $a$ therebetween remains fixed. On the other hand optical sensing unit 10 is pivotally mounted on bracket 40 and has a segmented gear 41 secured to it in any suitable fashion. A potentiometer 42 is mounted on a bracket 43 and has the gear 44 secured to its shaft. Servo motor 45 is mounted on bracket 46 and has gear 47 secured to its output shaft. In accordance with the feature of this invention gears 44 and 47 are arranged to mesh with the segment gear 41. Thus, by the means of the servo motor 45, an optical sensing unit 10 may be selectively pivoted to change the parallax angle $\theta$, while the potentiometer 42 serves to provide an indication of the position of optical sensing unit 10. The manner in which the servo motor 45 is selectively energized to change angle $\theta$, and the manner in which the output of potentiometer 42 is utilized for providing indications of angle $\theta$ are described in greater detail below.

FIGURE 4 of the drawing indicates graphically the output signals from the sensors 10 and 10' when an opaque object 48, moving in the track path direction indicated by the arrow 49, blocks in succession the two ray bundles defined by ray lines 36 and 37, and by ray lines 38 and 39, respectively. The voltage signal 50 is generated by the optical sensor 10 and the voltage signal 51 is generated by the optical sensor 10'. The time interval between the leading edges of these two signals represents the parallax integral $t$, that is, the time taken by the object 48 in traversing the distance between the first and second ray bundles. Those skilled in the art will appreciate that although the curves of FIGURE 4 indicate the parallax interval $t$ in terms of the time between the leading edges of the signal pulses, the parallax interval may also be measured between the trailing edges of the signal pulses, thereby corresponding to the transit of the trailing edge of the moving object 48. In explaining the operation of the optical sensing system shown in FIGURE 3, it will be assumed that V equals the velocity of the object 48 and that the distance $S_3$ which the leading edge 53 of object 48 travels during the transit interval is equal to $Vt$, that is, velocity multiplied by time, neglecting the widths of the ray bundles which in practice can be made negligible.

It will also be assumed that $S_2$ represents the distance from the track path of the object to the mutual crossover point of the two ray bundles. Thus, with negligible error for the small angles of the parallax angle $\theta$.

$$S_2 = \frac{VT}{\theta} \quad (1)$$

And for rotating objects:

$$S_2 = \frac{\omega R t}{\theta} \quad (2)$$

Where $\omega$ is expressed in radians per second, R is the distance from the axis of rotation to the sensors expressed in suitable units of length, $\theta$ is expressed in radians and $t$ is expressed in seconds.

Similarly $S_0$, the distance from the sensors to the mutual crossover point of the ray bundles, substantially equals:

$$S_0 = \frac{d}{\theta} \quad (3)$$

Where $d$ is the distance separating the two sensors and the location of the sensing units is preferably taken as the nodal points of their lenses 12 and 12', respectively. Also it will be realized that:

$$S_1 = S_0 + S_2 \quad (4)$$

The relationships given above show that from the parallax angle and the parallax interval, or transit time, the distance to the object, $S_1$, may be determined if its velocity is known.

Since the invention is adapted to the determination of the distance between a portion of a moving object and a datum plane, a similar determination can be performed for other portions of the moving object. Thus, from the distance data for any desired number of portions of the moving object, the conformity thereof while in motion can be determined. Accordingly, the strain and displacement effects of dynamic stresses in the moving body can be determined.

If, for example, the blade of a helicopter rotor is considered, the deflections of portions thereof at different radial distances from the rotational axis can be determined while the rotor is in motion and while it is subjected to the composite actions of vibration, centrifugal force, aerodynamic loading, and the like. The determination of position, and consequently the deflection of portions of the rotor blade at different radial distances from the rotation axis, can be accomplished in accordance with this invention either by means of a plurality of parallax interval sensing devices disposed at different radial distances from the rotational axis, or alternatively by means of one or more parallax interval sensing devices arranged to be selectively movable to different positions along the line radiating from the rotational axis.

In order to determine the relative blade track positions of the rotor blades, either on the ground or during flight, consider for purposes of illustration a helicopter 55, such as that shown in FIGURE 5 of the drawing, having a single three-bladed rotor assembly 56 and a sensing device 57 attached to the fuselage 58 of the helicopter 55 at a radius R from the axis of rotation. Advantageously the sensing device 57 comprises the structure shown in FIGURE 3 of the drawing with the exception that the photocells 19 and 19' are of the photomultiplier type. Further it will be readily understood that the invention may be utilized with other types of rotating systems, such as helicopters having dual rotors and rotors having two or more blades, with equally advantageous results.

FIGURE 6 is a block diagram of one circuit adapted for utilizing the signals from the helicopter mounted sensing device 57 to permit a comparison of the blade track position during rotation of the rotor, either on the ground or in flight. In accordance with a feature of this invention, the electronic conversion unit shown in FIGURE 6 serves to convert the signals from the sensing device 57 to the distances $S_2$ as defined in Equation 2 hereinabove.

Those skilled in the art will readily appreciate that when photo-multipliers are used, the high source impedance of the photo-multiplier signal output requires the use of a cathode follower impedance coupler in close proximity to each sensor to drive the relatively low impedance cable and the electronic conversion circuit shown in FIGURE 6. It further will be appreciated that since the output from the sensors is not characterized as the photocell current but rather as a voltage occurring across an output load resistance, the output sequence of signal pulses is inverted, with respect to polarity, from that indicated in FIGURE 2, and is shown by the step signals A and B in FIGURE 7 which occur at the corresponding locations A and B in the block diagram of FIGURE 6. FIGURE 7 is a graphical diagram of the voltages which occur at various times in positions within the circuit of FIGURE 6. The numerals 1', 2' and 3' indicate in vertical position, the time regions of transit of the rotor blades 1, 2 and 3 respectively. The letters A, B, C, etc. indicate the sequence voltage time relations occurring at the corresponding lettered positions within the circuit of FIGURE 6.

*Automatic gain control*

Since the sensing device 57 of FIGURE 5 is pointed skyward, it may be subjected to very large variations in the ambient light level at different times. The effect of this may be to alter the base level and pulse height of the signals A and B in FIGURE 7, which in turn may impose a difficult signal level tolerance restriction in the input precision gate generator circuits 59 of FIGURE 6. This problem is avoided by incorporating two identical automatic gain control devices 60, each of which operates from one of the photo-multiplier cathode follower outputs within the sensing device 57, and in turn supplies to its respective sensor a biasing voltage such as to hold the output pulse height within substantially constant limits over an ambient light range of about 1,000 to 1.

The parallax or $\theta$ angle information originates in the sensing device 57. As indicated in FIGURE 3, a parallax angle potentiometer 42 is driven with sensor 10 by servo motor 45 for the reasons explained below.

*Input precision gate generator*

The input precision gate generator 59 receives A and B signals from sensing device 57 and converts them to a precision pulse C by the circuit means shown in greater detail in FIGURE 8 of the drawing. Pulses from the cathode follower of sensor 10 are direct current coupled to the grid of a pulse shaping and inverting amplifier 60. Grid current limiting and plate current cut-off greatly reduce the rise and delay time of the inverted output pulse. This inverted output pulse is differentiated by an RC coupling network 61 as shown in FIGURE 8. The trailing edge of the differentiated pulse is a positive pulse and is used to trigger the monostable multivibrator 62, whose output plate voltage immediately drops.

Pulses from the cathode follower of sensor 10' are similarly amplified and inverted in a pulse shaping and inverting amplifier 63, differentiated in an RC circuit 64, and used to trigger the monostable multivibrator 65. The precision pulse indicated at C in FIGURE 7 is determined by the time interval between the trailing edge of the A input pulse and the trailing edge of the B input pulse, and is developed from the monostable multivibrator 62 when a pulse from the multivibrator 65 occurs during the free running time of multivibrator 62. After the triggering of multivibrator 62, and prior to the triggering of multivibrator 65, the output of multivibrator 62 depresses the output potential to a value determined by the circuit constants, a value which, in one advantageous embodiment of the invention, went from positive 150 volts prior to the triggering of the multivibrator 62 to positive 110 volts after the triggering of the multivibrator. When the multivibrator 65 is triggered, the positive going output pulse at its plate which is coupled to the triode cathode follower 66, drives the grid of triode 66 positive. At this instant, the cathode of the cathode follower triode 66 also goes positive and since it is coupled to the output plate of multivibrator 62, the multivibrator 62 switches or flip-flops and the output potential rises to its initial value. A diode limiter 67 prevents surges of the precision pulse output above a predetermined value. The wave shape of this precision pulse gate is indicated at C in FIGURE 7.

The input precision gate generator 59 also generates the two pulses D and F in FIGURE 7, which pulses are of substantially constant duration and begin at the end of each precision pulse C. Pulses D and F are generated by the positive going pulse at the output of the multivibrator 65. These pulses are coupled to the grid of a triode phase splitter 68. The output pulse at the cathode of the triode phase splitter 68 is in phase with the grid signal and is coupled out through a diode circuit (not shown) to preserve its sharply defined leading edge. This pulse is shown at F in FIGURE 7.

The output pulse at the plate of the triode phase splitter 68 is 180° of the phase with respect to its input grid signal. This pulse is passed to a twin diode clamping circuit 69 which clamps the wave form between two predetermined voltages to facilitate its use in subsequent circuits. This pulse is indicated at D in FIGURE 7. The duration of both the D and F pulses is equal to the free running time of the monostable multivibrator 65.

*Inch-per-second computer*

A velocity computer in the form of an inch-per-second computer is shown at 70 in FIGURE 6 of the drawing and receives r.p.m. data from the reference signal generator, indicated at the magnetic pickup 71. The inch-per-second computer 70 also receives radius data from a radius control potentiometer 72 and multiplies the r.p.m. data and the radius data together. The output product of the multiplication is a D.C. voltage, E inches per second, and is proportional to blade velocity, $V = \omega R$. Advantageously, in one embodiment of the invention, the reference signal generator may comprise an armature 73 of soft magnetic material and the magnetic pickup 71, which may comprise a coil placed around a permanent magnet core. Armature 73 is suitably affixed to some part of the rotating blade system, such as the rotor swash plate, while pickup device 71 advantageously is mounted in a fixed position so that the armature 73 will pass in close proximity thereto once each revolution of the rotor blades. This arrangement produces a pulse of induced voltage in the coil of the pickup device 71 that is indicated at G in FIGURE 7. The first blade passing over sensing device 57 after passage of armature 73 over pickup device 71, is designated as blade 1 or the master blade, the second blade passing over sensing device 57 is designated blade 2, and third blade passing over sensing device 57 is designated as blade 3, etc.

The inch-per-second computor 70 is shown in greater detail in FIGURE 9 of the drawing. The pulse G generated in the magnetic pickup device 71, as described above, is coupled through an RC circuit to the grid 74 of a conventional bi-stable multivibrator 75. If, for the purpose of illustration, it is assumed that the multivibrator 75 is in its normal stage when triode 76 is conducting and triode 77 is cut off, then the negative going slope of pulse G, RC coupled to grid 74, will drive the grid negative with respect to its cathode 78. The voltage at plate 79 will then rise towards its supply potential as supplied to the triode 76 through the positive supply lead 80, which supply potential, e.g. will be assumed to be +150 volts. The potential change at plate 79 is direct current coupled to grid 81 of triode 77, and grid 81 is driven above its cut-off bias point. This causes triode 77 to conduct and the voltage at its plate 82 drops sharply to the quiescent value of about +50 volts, as determined by the circuit constants. The change in potential at plate 82 is coupled in the conventional manner to grid 74 of triode 76 and holds grid 74 below its cut off point. Multivibrator 75 is then in its second stable state.

The second stable state is maintained until the passage of a rotor blade over sensing device 57. As stated above this first blade has been defined as blade "1" or the master blade. Passage of blade "1" over sensing device 57 initiates pulse D which is differentiated by RC circuit 83 and coupled through diode 84 to grid 81 of triode 77. The differentiated leading edge of pulse D is a negative going pulse which restores multivibrator 75 to its first or initial stable state with a corresponding sharp rise in the voltage at plate 82 of triode 77 to approximately its supply potential, 150 volts. The positive going pulse due to the differentiated trailing edge of the D pulse is blocked by the diode 84. In this stable state the multivibrator 75 is insensitive to all further D trigger pulses because of the blocking action of diode 84 until it is again triggered by magnetic pulse G into its second stable state.

The negative going square wave pulse from plate 82 of multivibrator 75 is coupled to an RC differentiating network and amplifier 85. The amplifier portion has its grid negatively biased below cutoff and the plate of the amplifier during cutoff assumes the positive D.C. potential picked off by the wiper of the radius potentiometer 72. Advantageously the wiper 72 is positioned in accordance with a calibrated scale to the distance R between the axis of the rotating members and the sensing device 57. The differentiated leading edge of the square wave output of multivibrator 75 is negative going and consequently it merely drives the grid of amplifier 85 more negative, but the trailing edge when differentiated is positive going and drives the grid sufficiently in the positive direction to cause the amplifier to conduct. The amplifier is held conducting for a short period until the charge on the differentiating capacitor leaks off, in accordance with the known operating principles of the differentiating circuit. The output is taken directly from the plate of amplifier 85 and has the waveform indicated at H in FIGURE 7. Pulse H, in addition to its primary function of forming the inch-per-second voltage, is further utilized in the circuit of FIGURE 6 as described in greater detail below.

The output pulses H from amplifier 85 are limited to positive values by the action of a diode limiter 86 whose plate is returned to ground. Therefore, the potential at point 87 in the circuit is a positive variable voltage proportional to the setting of radius potentiometer 72 and pulsed to zero volts once per revolution of the rotor blade by the amplifier 85. This pulse is of sufficient duration to permit the integrating computation to take place in operational amplifier 88.

Capacitor 89 charges through resistor 90 to the voltage determined by the setting of radius potentiometer 72 during the intervals between successive pulses H. Since the charging voltage and the capacitance of capacitor 89 are specified, capacitor 89 gains a charge during these intervals proportional to the radius setting. During pulse H, when the positively charged side of capacitor 89 is brought to zero potential, a discharge path is provided by coupling diode 91 to the operational amplifier 88. When the discharge current reaches zero, the cathode of diode 91 returns to a slightly more positive potential with respect to its plate and the circuit is opened. This switching action keeps the input of the operational amplifier 88 isolated except when it is pulsed.

In accordance with a feature of this invention, the operational amplifier 88 advantageously may take the form of a high gain, direct current, feedback amplifier which performs the function of integrating the relatively short duration, high amplitude, current surges which occur when capacitor 89 discharges through the coupling diode 91. The output of operational amplifier 88 is a D.C. voltage proportional to the amount of charge transferred per unit time from the capacitor 89.

Two overall loop feedback paths are provided from the output to the input of the operational amplifier 88 to establish the basis for the computation desired. One loop contains capacitor 92 and functions as the integrating capacitor, supplying the current surges demanded by capacitor 89 when it is discharged. In effect, capacitor 92 causes the input capacitance of amplifier 88 to be increased to the order of several hundred microfarads. As a consequence, the input of amplifier 88 becomes a very low impedance discharge path for capacitor 89 and the voltage at the amplifier input remains substantially at zero for even large current surges.

The second loop, which also originates at the output of amplifier 88, comprises an integrating network consisting of capacitor 93 and resistor 94 which is coupled to the grid of a cathode follower 95, all located in the output computer 96. The output of cathode follower 95 is a smooth inch-per-second voltage. This inch-per-second voltage is fed through a resistor 97 to the input of operational amplifier 88 to complete the loop. It is a feature of this invention that overall loop stability is obtained by paralleling resistor 97 by the series resistor-capacitor circuit indicated generally at 98.

With each pulse from amplifier 85, capacitor 89 transfers a negative charge to the input of operational amplifier 88. With each transferred charge, the instantaneous voltage across capacitor 92 must increase by an increment. Since the input voltage of operational amplifier 88 must remain constant at about zero, the increment of voltage appears at the output. Without the D.C. feedback provided, the output voltage of operational amplifier 88 would increase in steps to the saturation limit of the amplifier. However, because this stepping output voltage is smoothed by resistor 94 and capacitor 93, the feedback voltage becomes a relatively smoothly rising voltage level. As this feedback increases, the current also increases through the feedback resistor 97. This current begins to discharge integrating capacitor 92 between charging pulses.

When the current feedback substantially equals the average current supplied by the capacitor 89, the average inch-per-second voltage levels off at some value determined by the number of charges per unit time, the average magnitude of the incremental charges, and the value of the feedback resistor 97. Therefore, when the circuit finally stabilizes, exactly as much charge leaks off capacitor 92 through resistor 97 as is supplied by the capacitor 89.

*Output computer*

The output computer indicated generally as 96 in FIGURE 6, receives blade velocity data from the inch-per-second computer 70, time data from the input precision gate generator 59 in the form of pulse train C, and parallax or $\theta$ angle data from sensing unit 57. The output computer 96, processess all of this data to satisfy the equation previously given:

$$S_2 = \frac{\omega R t}{\theta} \qquad (2)$$

The output of the computer 96 is in the form of a pulse train J, in which the amplitude of each pulse is proportional to the distance $S_2$ from the optical crossover point to the blade for which the computation has been made.

The circuitry for the output computer 96 is shown in greater detail in FIGURE 10 of the drawing. In this circuit, the cathode follower 95 is used as a constant current load device and has its plate voltage maintained at a substantially constant positive D.C. level during operation. As described above, smoothed or integrated inch-per-second voltage which has been filtered by the integrating network consisting of resistor 94 and capacitor 93 is applied to the grid 97 of the triode 95. The cathode load consists of a series combination of fixed resistor 98 and the parallax angle potentiometer 42 located in the sensing device 57. The voltage across the cathode load is determined by the D.C. level at the grid 97. The total cathode resistance varies linearly as the angle $\theta$, and therefore the plate current of triode 95 is directly proportional to the tangential velocity of the blades, $\omega R$, and inversely proportional to the crossover angle $\theta$. The smoothed inch-per-second voltage is available for feedback from the cathode to the inch-per-second computer operational amplifier 88.

Triode 100 functions as a gate tube in accordance with the invention. Its plate is at a positive D.C. potential and its grid is returned to a somewhat less positive D.C. potential through a resistor 101. The grid is also coupled through capacitor 102 to the input precision gate generator 59 from which it receives the precision pulse train C. Between precision pulses, the cathode of triode 100 is at substantially grid potential and is the voltage source for the plate of triode 95. During each precision pulse, the grid of triode 100 is driven below cutoff thereby interrupting conduction through the triode.

Following each precision pulse when conduction through triode 100 resumes, its cathode supplies charging current to the capacitor 103. The charging path is completed through diode 104 to a point on the voltage divider network consisting of resistors 105 and 106. This point is maintained slightly positive with respect to ground. The effect of this slightly positive voltage is to inhibit conduction through coupling diode 107 between precision pulses.

During the precision pulse when gate tube 100 is cut off, the charge on capacitor 103 decreases at a substantially linear rate and provides the current demanded by triode 95 and its associated circuitry. Passage of current in this direction through capacitor 103, initiates conduction through coupling diode 107 and constant current is drawn from the input of operational amplifier 108. At the end of a precision pulse, conduction through triode 100 resumes, capacitor 103 is recharged to its original potential, and diode 107 ceases to conduct.

In accordance with a feature of this invention the operational amplifier 108 is used to generate unidirectionally positive, trapezoidal pulses of constant duration whose amplitude is directly proportional to the computed value of blade height above the crossover point for each blade. The blade height computations are completed in the time increment of the precision pulse. During this period, the output of amplifier 108 rises linearly from zero volts at a rate proportional to the current demanded of the operational amplifier input. The ultimate pulse amplitude is a function of the product of current demanded and precision pulse time, or of the total charge transferred per pulse. Since the current demanded is substantially constant for any given blade tangential velocity and parallax angle $\theta$, pulse amplitude is proportional to precision pulse duration or blade height. At the termination of the precision pulse, current flow through the input coupling diode 107, becomes zero or substantially so. Since the output voltage slopes also becomes zero, the output voltage becomes constant and its held until the output is reset to zero in the manner explained below.

Operational amplifier 108 is a high gain direct current, feedback amplifier provided with a cathode follower output. Amplifier 108 is direct current coupled through a high frequency stability network consisting of a resistor 109 and capacitor 110 to the grid of triode 111.

Two overall feedback loops to the input of operational amplifier 108 as well as the pulse train J are taken from the cathode of triode 111. The feedback loops establish the desired functional and operating characteristics of the operational amplifier 108. A capacitor 112 functions as the integrating capacitor which supplies the current surges demanded during a precision pulse.

The second overall feedback path is through diode 113 which is in parallel with the integrating capacitor 112. For the negative input currents to amplifier 108 that take place during the computation period, the cathode of diode 113 is positive with respect to the plate, and therefore the diode does not conduct. When operational amplifier 108 is being reset, positive currents are supplied to its input and the output voltage is driven in a negative direction to zero or substantially so. When the output voltage reaches zero, diode 113 conducts and in this manner the diode prevents the output voltage from going more negative than zero.

Resetting of operational amplifier 108 to zero, before each new blade height computation is accomplished by a conventional bi-stable multivibrator 114 and its associated circuitry in compliance with signals provided by pulse trains C and D. The leading edge of a precision pulse in wave train C marks the beginning of a computation period which lasts the length of the pulse. Consequently, the resetting action of multivibrator 114 must be inhibited for a period beginning at the same instant as the precision pulse. Advantageously, the inhibiting action on multivibrator 114 continues through the computation period and for some finite time thereafter.

The precision pulse C is differentiated by the capacitor 115 and resistor 116. The negative-going impulse derived from the differentiation of the leading edge of pulse C is coupled to one stage of multivibrator 114 through diode 117. This causes the voltage to drop sharply at the output or second stage from substantially +125 volts to the steady state voltage of +35 volts, where it remains until a subsequent trigger pulse of positive polarity is applied to the first stage of the multivibrator. The positive trigger pulse resulting from differentiation of the trailing edge of a precision pulse is blocked by diode 117 and does not initiate any change in the output of multivibrator 114.

The D pulse is differentiated by capacitor 118 and resistor 119, and is coupled to the first stage of multivibrator 114 to supply the positive polarity trigger pulse needed to restore the multivibrator to its initial steady state condition. Since the differentiator comprised of capacitor 118 and resistor 119 is clamped to ground by diode 120, the diode side of capacitor 118 rises above ground to the peak value of the trailing edge of the D pulse, applying a positive trigger impulse to the first stage of multivibrator 114 to initiate the restoration of the original stable state. A steep rise in the output voltage of multivibrator 114 to its first steady state condition results.

Thus, the output of multivibrator 114 is a negative going substantially rectangular pulse whose duration is equal to the sum of the lengths of the precision pulses C and D, plus the small time interval due to circuit constants.

The output of multivibrator 114 is coupled through resistor 121 and neon glow lamp 122 to the input of the operational amplifier 108. Since the input of operational amplifier 108 is always at a potential very close to zero, neon glow lamp 122 is ignited during the period of high output from multivibrator 114, and conversely neon glow lamp 122 is extinguished during the period when the multivibrator output is low. When the glow lamp 122 is ignited, a small current is applied to the input of operational amplifier 108. Current flowing through glow lamp 122 into the operational amplifier 108 causes the output voltage thereof to decrease. When the output voltage of operational amplifier 108 reaches zero, diode 113 conducts, thus limiting the negative excursion of pulse train J at zero or substantially so in the manner explained above. When the precision pulse C, triggers multivibrator 114, the neon glow lamp 122 is extinguished and the output voltage of operational amplifier 108 may rise to any value within its capacity range as determined by its input current information.

*Ring counter*

The ring counter 120, shown in FIGURE 6, receives stepping data from pulse train F generated in the input precision gate generator 59. Reset data is received from the inch-per-second computer 70 as pulse H. Ring counter 120 is of the type having plural stages wherein one stage is in the "on" condition and the remaining stages are in the "off" condition and the "on" stage is stepped through the ring counter in response to pulses applied thereto. The successive pulses in pulse train F transfers the "on" stage to the next following ring stage to open a storage gate corresponding to a rotor blade so that it may accept the proper output computer pulse in wave train J. To insure proper phasing of the ring counter 120 so that its number one position corresponds to the transit of blade "1," and its number "2" position corresponds to the transit of blade "2," etc., reset pulse H is used. As described hereinabove, for each revolution of the rotating device being measured, a reset pulse is originated. This pulse resets the ring counter 120 to its number one position.

The outputs of the several stages of ring counter 120 are individually fed to separate clamping networks (not shown). The clamped output on the first ring counter stage, corresponding to the master or number "1" blade, is fed directly as wave train K to the meter storage gate 122 and to the recorder gate 121. The outputs of the remaining stages of ring counter 120 are fed to the switching network indicated generally at 125, to the meter storage gate 122, and to the recorder gate 121. A typical output waveform from switching network 125, such as occurs for each of the several stages of the ring counter 120, is illustrated at L in FIGURE 7 of the drawing.

Although the ring counter 120 is illustrative as having six stages this number is merely illustrative and a fewer or greater number of stages may be used. Those skilled in the art will readily appreciate that when a different number of stages is used the switching network 125 would be modified to correspond to the number of stages present in the ring counter 120. In view of the well-known nature of ring counters in the electronics arts the details of ring counter 120 are not shown and any suitable ring counter adapted to provide outputs at each of its plural stages may be advantageously used in the circuit of FIGURE 6.

*Meter storage gate*

The meter storage gate 122 shown in FIGURE 6, receives wave train J containing blade height information for all blades, wave trains D and K, and a selected ring counter gate pulse L from the switching network 125. In accordance with an aspect of this invention a pulse in the D wave train in conjunction with a selected ring counter gate pulse allows the output computer information corresponding to a particular blade to be stored in a memory circuit. This results in a stored voltage proportional to the blade height $S_2$ above the optical crossover point for the selected blade. In the illustrative embodiment disclosed herein, two such memory circuits are provided. One circuit is adapted to continually monitor the master or number "1" blade, and the other circuit monitors a blade selected for comparison. The two resulting voltages are passed to an inches displacement meter 124 which indicates the relative displacement between the two blades being compared.

The meter storage gate circuit is shown in schematic detail in FIGURE 11 of the drawing. A pair of triodes 125 and 126 serve as coincidence amplifiers; that is, two signals in time coincidence are required at their grid inputs to produce an output. Wave train K corresponding to the master or number "1" blade, is fed through resistor 127 to the grid of triode 125, and wave train L, corresponding to the blade selected for comparison, is fed through resistor 128 to the grid of triode 126. In addition both triodes 125 and 126 also have wave train D applied to their grids through resistors 129 and 130, respectively. For purposes of illustration the wave train L illustrated in FIGURE 7 corresponds to the switch position shown in FIGURE 6, that is, for the second or number "2" blade. Manifestly wave train L may be made to correspond to any other blade by changing the position of the switch in the switching network 125.

The three wave train inputs, D, K and L, as applied to the grids of coincidence amplifiers 125 and 126 are negative. The cathodes of both coincidence amplifiers are also connected to a negative source through the lead 131. Consequently, grid resistors 132 and 133 of triodes 125 and 126, respectively insure that these two tubes will be held conducting unless the two negative inputs to the grid of each tube are in time coincidence. When the two pulses are in time coincidence at the grid of one of the triodes, the grid is driven below cutoff and the plate voltage of the tube rises to its maximum value. The plates of coincidence amplifiers 125 and 126 are connected to a positive source through resistors 134 and 135 respectively.

Twin triodes 136 and 137 act as gate tubes and are controlled by the coincidence amplifiers 125 and 126 respectively. The output computer wave train J is applied to a cathode and a plate of each gate tube through a balancing potentiometer 138. When the two input signals to a coincidence amplifier are in time coincidence, the coincidence amplifier is cut off and its plate voltage rises until it is substantially equal to the voltage at cathode 139 of twin triode 136 or cathode 140 of twin triode 137. The plate voltages of the coincidence amplifiers 125 and 126 are limited at this value by grid currents in their respective gate tubes 136 or 137. If the voltage at plate 141 of tube 136 or plate 142 of tube 137 is more positive than its respective cathode voltage, plate-cathode conduction in the tube will reduce the difference to a minimum value. Conversely, if the voltage at cathode 143 of tube 136 or cathode 144 of tube 137 is more negative than that of its respective plate voltage, plate-cathode conduction will reduce this difference to a minimum value. Therefore, during the period that a coincidence amplifier is turned off, either capacitor 145 associated with gate tube 136 or capacitor 146 associated with gate tube 137 is charged to the voltage corresponding to the computed blade height voltage information contained in wave train J.

In accordance with a feature of this invention an RC network comprised of resistor 147 and capacitor 148 is connected to plate 141 and cathode 143 of gate tube 136, and an RC network comprised of resistor 149 and capacitor 150 is connected to plate 142 and cathode 144 of gate tube 137. These two RC networks function as smoothing networks which averages the height data over a period of several revolutions of the device being tested. At the end of each pulse in the D wave train, the coincidence amplifier that was cut off, if either amplifier is cut off, again conducts to drive the grid of the gate tube with which it is associated below cut-off. The gate tube then blocks the storage of further data until it is again turned on by a coincidence amplifier. Between the gate-on periods the potential corresponding to the height data is stored in capacitor 148 or capacitor 150. The capacitor 151 connected to the grids of gate tube 136, and the capacitor 152 connected to the grids of gate tube 137 serve to reject any short duration or spiked rises in the plate voltages of coincidence amplifiers 125 and 126, respectively. The filaments or heaters 153 and 154 of gate tubes 136 and 137 are connected to the filament supply source generally indicated at 156 through a resistor 155. It is a feature of this invention that heater to cathode leakage is reduced in the gate tubes by connecting one side of the supply source for heaters 153 and 154 to a point between two equally valued resistances 159 and 160 in the cathode circuit of the tube 161. The result of this arrangement is that heaters 153 and 154 operate at a potential midway of that across cathodes 165 and 166 of tube 161.

In order to obtain a precision meter readout of the data stored in capacitors 148 and 150, a high impedance comparator circuit is provided which is capable of taking the difference of the two voltages present and using this difference data to drive a meter. The high impedance comparator circuit in accordance with this illustrative embodiment of the invention comprises a differential current amplifier or differential cathode follower 161. Amplifier 161 is a dual triode tube and has both plates thereof connected to a positive potential source through the plate resistor 167. The voltage present between the two cathodes 165 and 166 of tube 161 is the desired difference voltage, and the cathodes present a sufficiently low source impedance to drive the null center micro-ammeter 124 through a calibrating resistor 164. Those skilled in the art will readily appreciate that in lieu of the ammeter 124 a null center voltmeter may be used with equally advantageous results. Resistors 157 and 158 are provided as cathode load resistors for the differential cathode follower 161.

To insure zero meter movement when the input grids of the two triodes comprising cathode follower 161 are at the same potential with respect to each other, a heater emission balancing potentiometer 163 is used in circuit with the cathode follower heater 162. Thus potentiometer 163 may be adjusted to provide the desired zero meter movement.

It now can be appreciated that the deflection of the null center micro-ammeter 124 when averaged over several revolutions of the device being tested, is directly proportional to the difference in distances $S_2$ above the optical crossover point of blade "1" and any other blade used for comparison. Advantageously the meter 124 may be calibrated in any suitable units, for indicating this value.

*Recorder gate*

Since only the difference between the master or number "1" blade height and the height of another blade is available at the meter 124, a recorder gate 121, shown in FIGURE 6 of the drawing, is provided so that the instantaneous blade height of the several blades can be obtained. The recorder gate 121 receives wave train J from the output computer 96, wave train D, and wave train M representing the combination of all of the ring gate pulses after passage of the pulses through isolation resistors 170 through 175, inclusive. The output of recorder gate 121 is a wave train N and is made available to suitable auxiliary equipment through an isolation resistor 176 and the jack 99. Output wave train N also is fed to a servo control amplifier 123, whose purpose and function are described in detail, below.

One illustrative embodiment of the circuitry comprising recorder gate 121 is shown in greater detail in FIGURE 12 of the drawing. The recorder gate circuit comprises a triode 177 which serves as a coincidence amplifier operating in essentially the same manner as coincidence amplifiers 125 and 126 of FIGURE 11. In the operation of the invention, wave train D is fed through resistor 178 to the grid of triode 177. The second input to this grid is wave train M. Resistor 179 is connected between the input grid of triode 177 and ground to insure that the two negative inputs, that is, the pulses in wave trains D and M, to the grid of triode 177 are in time coincidence. If these inputs are not in time coincidence, triode 177 will be held in its conducting condition. However when the two pulses are in time coincidence, the grid of tube 177 is driven below cutoff and the plate voltage of the tube rises to a maximum. This action is achieved by connecting the plate of the coincidence amplifier triode 177 to a positive source through a plate resistor 180, and by connecting the cathode of tube 177 directly to a negative source.

The twin triode tube 181 acts as a recorder gate tube and is controlled by the plate voltage of coincidence amplifier 177. The output computer blade height voltage pulses contained in wave train J are applied to plate 182 and cathode 183 of gate tube 181 through the resistor 184. At the beginning of a sampling period and when the two inputs to the grid of triode 177 are in time coincidence, triode 177 is cut off and its plate voltage rises until it is substantially equal to the voltage at the cathode 183 of gate tube 181. The plate voltage of triode 177 is limited at this value because of the plate-cathode conduction in gate tube 181. Therefore, during the sampling period for each blade, capacitor 188 is charged to a voltage corresponding to the computed blade height. This stored voltage is applied to the grid of cathode follower 189, the plate of which is connected to a positive source of D.C. potential and the cathode of which is connected to a source of D.C. negative potential through the cathode load resistor 190. Instantaneous blade height data in the form of wave train N is available from the cathode of triode 189 and is made available for visual monitoring on an oscilloscope, or for recording on a direct writing recorder at the jack 99, shown in FIGURE 6 of the drawing. Capacitor 187 connected to the grids of the gate tube 181 serves to reject any short duration or spiked rises in the plate voltage of coincidence amplifier 177.

Those skilled in the art will appreciate from the foregoing circuit description, that the device used to record instantaneous blade height should have a relatively high internal impedance to avoid a voltage drop in the source impedance. To provide an identification of blades in the instantaneous blade height data, pulse train H is made available at jack 240, shown in FIGURE 6 of the drawing. Pulses in wave train H coincide with the passage of the master or number "1" blade over the sensing device 57.

Servo control

As pointed out in our co-pending application identified above, the use of two distinct sensing elements permits the measurement of distance at or very near the distance $S_0$, thus reducing the importance of vibrational disturbances of the sensing device and of errors in the determination of velocity. In accordance with a novel feature of this invention measurements of height very near the distance $S_0$ are effected by enabling the position of sensor 10, as shown in FIGURE 3, to be automatically changed in a selective manner. Automatically changing the position of sensor 10 in the selective manner also keeps the distance $S_2$ small and thereby minimizes errors. Thus, in turn, the parallax angle $\theta$ is changed in accordance with the change in the position of sensor 10. The servo motor 45 which effects a change in position of the sensor 10 is controlled by the servo control 123 shown in FIGURE 6.

The details of the circuit of the servo control 123 are shown schematically in FIGURE 13 of the drawing. The twin triode 191, whose halves are identified as 191A and 191B, together with its associated circuitry constitutes a sensing device that controls the drive direction of servo motor 45. As explained above, the function of servo motor 45, located in sensing device 57, is to position sensor 10 with respect to sensor 10' to obtain an optimum parallax angle $\theta$. The servo control 123 accomplishes this by monitoring the height data of the lowest blade in the device being tested, and controlling servo motor 45 such that the distances $S_2$ for this blade is within definite and narrow physical limits. For the purposes of illustration in the embodiment described here, these physical limits may be established as from two to four inches although it will be recognized that other limits may of course be employed with suitable modifications in circuitry.

Grid 192 of triode 191A is connected to a long time constant RC network comprising resistor 196 and capacitor 195. The grid 192 also is coupled to wave train N through diode 194. The capacitor 195 can charge through resistor 196 from the positive D.C. line to the least positive voltage level in the instantaneous blade height waveform N. When capacitor 195 has charged to the least positive voltage level, diode 194 will break down and diode current will limit further increase of capacitor voltage. The least positive voltage in waveform N is the voltage which describes the position of the lowest blade. The charging time-constant of the R-C network is established sufficiently long to prevent the voltage on the capacitor from following the rapid voltage excrusions associated with displacements other than the lowest blades displacement. Therefore, the voltage on grid 192 is equal to the instantaneous output voltage for the lowest blade.

For example, if the voltage on grid 192 is +19 volts corresponding to a distance $S_2$ of substantially three inches, and if the voltage on grid 193 is set at +19 volts by means of potentiometer 202, the voltages on both cathodes will be the same. Under these conditions, no current will flow through the diode 201 connected across the cathodes of tube 191. In accordance with a specific embodiment of this invention, diode 201 may advantageously be of the "Zener" type, the characteristics of which are well known in the art. When both cathode voltages are the same as described above, the plate current will be equal and will be sufficient to energize both plate relays R1 and R2, the coils of which are shown at 197 and 198 respectively.

When the blade height reaches the lower control limit, the voltage on grid 192 is somewhat less than that on grid 193. The cathode voltages are essentially unchanged, but tube 191A draws considerably less cathode current since the current differential is carried by the forward conduction of the "Zener" diode 201. The decrease of plate current of tube 191A causes the relay R1 to be de-energized.

At this time the relay R2 is still energized and the relay R1 is de-energized, and therefore the normally closed contacts 203 of relay R1 are closed and the normally opened contacts 206 of relay R2 are also closed. With contacts 203 and 206 closed, a source of power from 207 is connected to the servo motor 45 causing it to drive sensor 10 in the direction necessary to increase the parallax angle $\theta$, and hence to increase the distance $S_2$. This action continues until the voltages on grids 192 and 193 of tube 191 are substantially equal, at which point relay R1 is again energized to open contacts 203. If the blade height $S_2$ of the lowest blade reaches the upper control limit, the "Zener" diode 201 conducts in its reverse direction, which reverse conduction raises the cathode voltage of tube 191B a sufficient amount to reduce plate current conduction in that tube and to de-energize the relay R2. The de-energizing of relay R2 opens its normally open contacts 206 and closes its normally closed contacts 205. Since the normally open contacts 204 of relay R1 are closed at this time, the servo motor 45 is operated in the direction to decrease the parallax angle $\theta$ and hence the distance $S_2$. This action continues until the voltages on grids 192 and 193 of tube 191 are again substantially equal and both relays R1 and R2 are again energized.

It will readily be understood by those skilled in the art that the selective control of the parallax angle $\theta$ enables the circuits of the electronic conversion unit to be designed for narrower operating ranges than would be possible with units having a fixed parallax angle. With relatively narrow operating ranges, it is possible to obtain greater accuracy and reliability.

It will further be appreciated by those skilled in the art that while the foregoing description has been directed to an embodiment of the invention adapted for the determination of deviations of the elements of rotating machinery from a plane of reference, the value of such information is greatly enhanced when data is also available for any deviations occurring within the plane of reference itself. In accordance with an embodiment of this invention deviations occurring within the plane of reference may be determined by the following circuitry.

Angle detection

FIGURES 14 and 15 of the drawing illustrate an arrangement of sensors and rotating blades which advantageously may be used in the determination of the relative angles between adjacent blades. The configuration of FIGURES 14 and 15 differs from that of FIGURE 3 primarily in the separation of the two sensor heads from their common base. In addition the sensor heads are arranged so that the collimated ray bundle associated with each sensor is substantially parallel to the collimated ray bundle of the other sensor, and normal to the plane of rotation of the device being tested. This arrangement while not necessary to the operation of the invention, is preferred, and facilitates the description which follows.

It will be understood that although a rotating device having three blades as shown in FIGURE 14 for purposes of illustration, devices having fewer or greater number of blades may also be utilized and come fully within the principles of the invention. In the arrangement of FIGURES 14 and 15, an armature 210 is attached to the hub portion 211 of the rotating device. A pickup device 212 is operatively associated with the armature 210 and is mounted in a fixed position so that the armature 210 will pass in close proximity thereto once each revolution of the device being tested. Advantageously armature 210, and pickup device 212 may be similar to the armature 73 and pickup device 71, described hereinabove. The first blade to pass over a sensor after the initiation of a pulse from pickup device 212 is designated as blade number "1," the second blade as blade number "2" and the third blade as blade number "3."

With the sensor heads 214 and 215 disposed in the manner shown in FIGURES 14 and 15, and with the direction of rotation being that indicated by the arrow 213, the first blade to pass over sensor 214 after the pulse from pickup device 212 is the blade number "1." The next blade to pass over a sensor is blade number "2" over the sensor 215. If the interval between pulses from the sensors 214 and 215 is designated as $t_b$, and it can be seen that the distance blade number "2" moves between pulses is:

$$\Delta S_2 = \omega R t_b \quad (5)$$

where R is the radius from the center of the rotating elements to each sensor head, and $\omega$ is the rotational speed in radians per unit time. Similarly, an interval $t_c$ and a distance $\Delta S_3$ are associated with blade number "3" after approximately 120° of rotation as indicated by the sensor 217 shown in dotted outline adjacent to blade "3."

Further it can easily be seen that the expression defining $\Delta S_2$ is similar to that for the blade height $S_2$ discussed above where:

$$S_2 = \frac{\omega R t}{\theta} \quad (2)$$

If $\theta$ could be replaced by unity in the expression for $S_2$, the electronic conversion unit described in connection with FIGURES 6 and 7 could be used to compute $\Delta S_2$. In accordance with a feature of the invention the replacement of $\theta$ with unity is performed for the configuration of FIGURES 14 and 15 by replacing the $\theta$ potentiometer 42, shown in FIGURE 3, with a fixed resistor (not shown). Then the electronic conversion unit may be used to compute the distance $\Delta S_2$.

From an examination of FIGURE 14, it can be seen that the angles $\beta_1$, $\beta_2$ and $\beta_3$ may be expressed in terms of $\Delta S_2$ and $\Delta S_3$ as follows:

$$R\beta_1 = \frac{360°}{n} + \Delta S_2 \quad (6)$$

$$R\beta_2 = \frac{360°}{n} + \Delta S_3 - \Delta S_2 \quad (7)$$

$$R\beta_3 = \frac{360°}{n} - \Delta S_3 \quad (8)$$

where $n$ equals the total number of blades in the rotating device being tested. Also for a device with $n$ number of blades, any angle $\beta_x$ equals $$R\beta_x = \frac{360°}{n} + \Delta S_{x+1} \Delta S_x \quad (9)$$

Where $x$ is an integer greater than one and elss than $n$. Also for a value of $n$ greater than two:

$$R\beta_n = \frac{360°}{n} - \Delta S_n \quad (10)$$

For the arrangements shown in FIGURES 14 and 15, the electronic conversion unit will compute the distance $\Delta S_2$ for the first pair of blades interrupting the ray paths of sensors 214 and 215 after the magnetic pulse is received. For the second pair of blades, the distance computed is equal to $\Delta S_3 - \Delta S_2$. If the switching network 125, shown in FIGURE 6, is set to position 2, these computed amounts will be compared and the difference as shown on the meter 124 will be:

Meter reading 2 (hereinafter shown as *2)=
$$(\Delta S_3 - \Delta S_2) - \Delta S_2 \quad (11)$$

since this is the same result as will be obtained by subtracting $R\beta_1$ from $R\beta_2$ it can be said:

$$*2 = R\beta_2 - R\beta_1 = \Delta S_3 - 2\Delta S_2 \quad (12)$$

Similarly, for the switching network 125 set at position 3 for a three bladed system:

$$*3 = R\beta_3 - R\beta_1 = -\Delta S_3 - \Delta S_2 \quad (13)$$

Since the meter readings obtained from the electronic conversion unit are relative to a reference angle between the two sensors that is not known, these meter readings are not directly usable. However, by solving the equations for meter readings 2 and 3 above for $\Delta S_2$ or $\Delta S_3$, usable information is obtained. Therefore, $$*2 + *3 = -3\Delta S_2, \text{ or } \Delta S_2 = \frac{-(*2 + *3)}{3} \quad (14)$$

and:

$$\Delta S_3 = -*3 - \Delta S_2 = \frac{-2 \times *3 + *2}{3} \quad (15)$$

Expressions similar to the last two equations may easily be derived from the case where the device under test has $n$ number of blades. The expression for blade number 2 is:

$$\Delta S_2 = \frac{-(*2 + *3 \ldots + *n)}{n} \quad (16)$$

For any blade $x$ where the limitations on $x$ are as stated above, the expression is:

$$\Delta S_x = *(x-1) + *(x-2) + \ldots$$
$$+ *2 \frac{-(x-1)(*2 + *3 \ldots + *n)}{n} \quad (17)$$

and for blade $n$ where $n$ is greater than two:

$$\Delta S_n = \frac{-(n-1)*n + *2 + *3 + \ldots + *(n-1)}{n} \quad (18)$$

In interpreting the answers found by use of the last five equations, the sign of the answer indicates whether a particular blade is leading or lagging with respect to its normal position relative to the number 1 blade. A positive sign indicates a lag and a negative sign indicates a lead.

The arrangement shown in FIGURE 16 illustrates a direction of rotation of the blades opposite to that of the direction of rotation of the blades of the arrangement shown in FIGURES 14 and 15, i.e., in a direction indicated by the arrow 220. If the sensors are arranged as shown in FIGURE 16 and the blades and the angles are designated as shown in FIGURE 16, then the last five equations apply without change.

The servo motor 45 associated with sensor 10 in FIGURE 3 is also similarly associated with sensor 214 in the arrangements of FIGURES 14 and 15 and 16, although the servo motor is not there illustrated. For these arrangements, the servo system works in an analogous manner. However, instead of monitoring the height data of the lowest blade in the device under test, the servo control 123, shown in FIGURE 6, monitors the smallest of the relative lag distances $\Delta S_2$, ($\Delta S_3 - \Delta S_2$), etc., and controls the servo motor 45 so that this distance is within definite and narrow physical limits. It is a feature of this invention that such a change in function may be accomplished without circuitry changes. The advantages resulting from use of the servo system in the determination of the relative blade lag, as described above, are the same as in the determination of blade height.

Dynamic lag

FIGURE 17 illustrates still another arrangement of sensors effecting parallax interval sensing. This arrangement is preferred for use in the determination of the dynamic lag of a single element or blade in a rotating system. Sensor 221 is positioned so that its ray path 222 will accept light beam or other suitable electro-magnetic energy beam reflected by mirror 224 from a source 225. Advantageously the source 225 has its output rays collimated. Illustratively, the mirror or reflecting element 224 is secured to the hub 226 of the rotating device under test. However, those skilled in the art will readily appreciate that the positioning of the mirror 224 is not limited to the hub 226 and advantageously may be secured to any other portion of the device under test that will result in the sensor 221 receiving light from the source 225 for each revolution of the device. While mirror 224 may take the form of any suitable type of reflector, a totally reflecting prism, that is a prism whose cross section is a right isoceles triangle, is preferred since a prism of this type materially reduces the time and effort necessary to align the energy source 225 with the sensor 221.

In accordance with the invention the sensor 227 is positioned while the device to be tested is at rest so that the ray path 228 of the sensor 227 is tangent to the leading edge of blade 229 and further the sensor 227 is preferably positioned at a radius R from the axis of rotation 230 of the rotating device. Thus it can be seen that if the device when tested is adapted to rotate in the direction of the arrow 231, the leading edge of the blade 229 is the edge designated as 232.

For the purposes of illustrating this embodiment of the invention, the sensors 221 and 227 may be considered as of the type illustrated in FIGURE 1 with the exception that the photocells are preferably of the photo-multiplier type. Further it will be considered that the aperture of the sensor 221 takes the form of an elongated slot oriented at right angles to the direction of transit of the mirror 224. A slot of this type, facilitates the alignment of sensor 221 and energy source 225, while still permitting the sensor to retain its ability to emit a sharp pulse when the mirror 224 reflects the energy beam from the source 225.

An armature 233 of soft magnetic material, similar to armature 73, is suitably attached to a portion of the rotating device, as by any convenient means. A pickup device 234, similar to pickup device 71, is mounted in a fixed position so that the armature 233 will pass in close proximity thereto once each revolution of the tested device. As in the other embodiments described, the pulse induced in pickup 234 once each revolution should occur prior to the passage of the blade over a sensor. In this configuration, the armature and pickup device is so positioned that the induced pulse in pickup device 234 occurs before the pulse originating in the sensor 221.

When the device to be tested is rotated in the direction of the arrow 231, any lag in the leading edge 232 of blade 229 is revealed by the time separation $t_x$, between pulses from sensors 221 and 227. This time separation $t_x$ is related to the lag distance S by the following expression:

$$S = \omega R t_x \qquad (19)$$

Since the last equation is substantially the same as Equation 5, it follows that circuit methods similar to those of FIGURE 6, as modified to compute lag distance $\Delta S_2$, may advantageously be employed to determine the lag distance S. One embodiment of a circuit that may be used to compute the lag distance S is illustrated in FIGURE 18 of the drawing.

Because the sensor 221 receives light from the source 225, the pulse A' from sensor 221 is inverted with respect to pulse A of FIGURE 7. The description of the invention is facilitated by the provision of an inverter circuit 235 which is shown as receiving the wave train A' and having at its output thereof the wave train A, having the same wave shape shown at A in FIGURE 7.

The input precision gate generator 59 receives the A and B signals and converts them into a precision pulse C' in the same manner as described above for FIGURE 6 and the wave train C' is similar to wave train C of FIGURE 7. However, with this configuration of sensors, wave train C' contains only one precision pulse between each pulse G from the reference pickup device 234. Those skilled in the art will readily appreciate that a rearrangement of inputs to the multivibrator 62 within the circuit of FIGURE 8, allows the inverter 235 to be omitted from the circuit of FIGURE 18. Also, since a ring counter is not present in the circuit of FIGURE 18, the lead for output waveform F of the gate generator 59 is not illustrated.

Computation of blade velocity $\omega R$ in inch-per-second computer 70, and its subsequent multiplication by "$t$" in the output computer 96 are performed in the same manner as described above for lag distance $\Delta S_2$. That is, the value $\omega Rt$ is computed, in the same manner as described for FIGURE 6 with the exception that a fixed resistor replaces the $\theta$ potentiometer. The output wavetrain J' of the output computer 96 is applied to the meter storage gate 236. It should be noted that wave train J' has the same characteristics as wave train J of FIGURE 7, but, since only one precision pulse C' is received between each pulse G from the reference pickup device 34, only one pulse appears in wave train J' between each pulse G.

The meter storage gate 236 receives the output computer information in wave trains J', D and O. A pulse in wave train D in conjunction with a pulse in wave train O allows the output computer information to be stored in a memory circuit. This results in a stored voltage proportional to the blade lag distance S. Since the meter storage gate 236 is identical in purpose to the meter storage gate 122 with the exception that a comparison need not be made between two pulses of the output computer, a description of storage gate 236 in terms of its differences from storage gate 122 will illustrate its operation.

Referring now to FIGURE 11, it can be seen that the meter storage gate 122 has as its sources of input information wave trains D, J, K and L. Since a ring counter is not present in the circuitry of FIGURE 18, wave trains K and L are not available as inputs to storage gate 236. For the application of FIGURE 18, the input wave train L may be dispensed with entirely, and wave train K is replaced with the wave train O from the inch-per-second computer 70.

Wave train O is similar to wave train K, which it replaces and wave train O conveniently may be generated in the inch-per-second computer 70. Thus, if the output of plate 79 of tube 76 in multivibrator 75 is coupled out through the RC network of capacitor 240 and resistor 241, and then clamped to a negative supply through the diode 242, wave train O results. Since wave train L is not present as an input to meter storage gate 236, thus removing the certainty of a zero reference for the output meter 237, the zero reference may effectively be achieved by means of the ground connection shown in the dotted outline at 243 in FIGURE 11. Since the output meter 237 is not required to make a comparison between two stored voltages in its meter storage gate, it may be a conventional micro-ammeter or voltmeter calibrated in any suitable and convenient units.

Those skilled in the art will appreciate from the description given above that the deflection of output meter 237, when averaged over several revolutions of the device being tested, is directly proportional to the distance S that blade 229 deflects at radius R from its axis of rotation.

Although in accordance with the statute the invention has been described in the form of several specific illustrative embodiments, it will be readily appreciated by those skilled in the art that the invention is not limited to these illustrative embodiments. Thus, while the invention requires a source of radiant energy for operation, it is apparent that the invention is operative with either transmitted or reflected radiant energy. The energy source itself may be a solar source or alternatively any other variety of electrically or chemically excited sources, fluorescent sources, flames, or even the radiation of the object being tested. The spectral energy may be entirely in the visible range, or in the infra-red or ultra violet ranges when suitably sensitive photoelectric detectors are employed.

Further, while the invention has been disclosed as utilizing magnetically induced pulses to provide r.p.m. data, such data may equally as well be generated by other methods, as for example, by capacitive changes in a circuit or by the pulse emitted by a photocell either upon the receipt or interruption of a beam of radiant energy. Still further the reference signal detector for providing the r.p.m. data may be in the form of a commutator attached to the shaft of the device under test or remotely driven from the tested device by means of coupled synchros. In such instances, a reference pulse is supplied by the commutator directly, as shown for example in the above identified copending application.

From the above description it will be apparent that this invention comprises improvements in sensing of the parallax interval and in determining parallax interval time, which determination may advantageously be employed for measuring distance or velocity without the physical contact in a variety of cyclically operating systems. While specific embodiments and arrangements have been illustrated in the above description, it will be understood that the details of configuration and construction of the invention may be varied through a wide range without departing from the principles of the invention and the scope thereof, as defined in the appended claims.

What is claimed as the invention is:

1. A system for making parallax interval measurements of cyclically moving objects comprising electro-optical sensing devices for receiving a plurality of radiant energy beams positioned in the path of said moving objects so as to be interrupted thereby in a sequential manner, said electro-optical sensing devices being responsive to the beam interruptions for producing electrical signals corresponding to said interruptions, a reference signal generator associated with the cyclically moving objects for producing reference signals having a frequency representative of the velocity of the cyclically moving objects, an electronic conversion circuit including computing means connected to said sensing devices and to said reference signal generator for computing information data in accordance with the relationship between said electrical signals and said reference signals, servo means connected to at least one of said sensing devices and responsive to said information data for varying the angular relationship of said sensing devices, and indicating means connected to said electronic conversion circuit and responsive to said information data for providing indications of said parallax interval measurements.

2. A system for making parallax interval measurements of rotating blades in an aerodynamic system comprising electro-optical sensing devices for receiving a plurality of radiant energy beams positioned in the path of moving objects so as to be interrupted thereby in a sequential manner, each of said electro-optical sensing devices including photoelectric cell means responsive to the beam interruptions for producing electrical signals in accordance with said interruptions, a reference signal generator associated with said rotating blades for producing reference signals having a frequency representative of the blade velocity, an electronic conversion circuit including computing means connected to said sensing devices and to said reference signal generator for providing blade track position data as computed from the time separation of said electrical signals and from said reference signals, servo means connected to at least one of said sensing devices and responsive to said blade track position data for varying the angular relationship of said sensing devices, and indicating means connected to said electronic conversion circuit and responsive to said blade track position data for providing indications of said parallax interval measurements.

3. A system for making parallax interval measurements in accordance with claim 2 including selectively operable switching means for enabling the blade track position data for any selected rotating blade to be applied to said indicating means for providing individual indications thereof.

4. A system for making parallax interval measurements in accordance with claim 2 wherein said computing means comprises a velocity computer adapted to receive reference signal data from said reference signal generator representative of the blade rotational velocity, $\omega$, and radius signal data representative of the distance from the axis of rotation to the sensing devices, R, for computing blade velocity data, $\omega R$, and an output computer adapted to receive blade velocity data, $\omega R$ from said velocity computer, time data, $t$, from said sensing devices, and parallax angle data, $\theta$, from said sensing devices for computing $$S = \frac{\omega R t}{\theta}$$

where S is representative of the track position for the rotating blade being measured.

5. A system for making parallax interval measurements of a rotating aerodynamic member comprising a plurality of spaced sensing devices defining a parallax angle, $\theta$, therebetween and adapted to produce electrical signals separated by a time period corresponding to the parallax interval of said member, a reference signal generator associated with the rotating member for producing reference signals having a frequency representative of the velocity of the rotating member, an electronic conversion circuit including computing means connected to said sensing devices and to said reference signal generator for computing information data in accordance with the relationship between said electrical signals, the parallax angle, $\theta$, and said reference signals, servo means connected to at least one of said sensing devices and responsive to said information data for varying the parallax angle, $\theta$, of said sensing devices, and indicating means connected to said electronic conversion circuit and responsive to said information data for providing indications of said parallax interval measurements.

6. A system for making parallax interval measurements of rotating aerodynamic members comprising a plurality of spaced sensing devices, defining a parallax angle, $\theta$, therebetween and adapted to produce electrical signals representative of the parallax interval of each rotating member, a reference signal generator associated with the rotating members for producing reference signals having a frequency representative of the velocity of the rotating members, an electronic conversion circuit including computing means connected to said sensing devices and to said reference signal generator for providing track position data for said rotating members, servo means connected to said sensing devices and responsive to said track position data for varying the parallax angle $\theta$ between said sensing devices in a direction to increase the accuracy of the parallax interval measurements, and indicating means connected to said electronic conversion circuit and responsive to said track position data for providing indications proportional to said parallax interval measurements.

7. A system for making parallax interval measurements in accordance with claim 6 wherein said reference signal generator comprises an armature of magnetic material rotatable with said rotating aerodynamic members, and inductive pickup means mounted relative to said armature such that a signal is generated in said pickup means for each revolution of said armature thereby, the signals generated in said pickup means thus having a frequency corresponding to the rotational velocity of said rotating members.

8. An electronic circuit for providing indications of the track position of a rotating object relative to a reference plane comprising a pair of spaced sensing devices defining a parallax angle $\theta$ therebetween and positioned to have their associated radiant energy beams interrupted by said rotating object and adapted to produce time separated electrical signals representative of the transit time of the rotating object, a selectively adjustable signal generator for providing a signal representative of the spacing between the axis of rotation of said object and said sensing devices, a third sensing device associated with said rotating object for generating a signal for each cycle of the rotating object, a velocity computer connected to said third sensing device and to said signal generator for producing velocity information signals as determined by the outputs thereof, an output computer connected to said velocity computer for receiving said velocity information signals, said output computer being further connected to a parallax angle signal generator associated with said sensing devices for receiving information signals representative of the parallax angle $\theta$ between said sensing devices, and storage and indicating means connected to said output computer for receiving data therefrom indicative of the track position of said rotating object.

9. An electronic circuit for providing indications of the track position of a rotating object relative to a reference plane comprising a pair of spaced electro-optical sensing devices positioned to have their associated radiant energy beams interrupted by said object and adapted to produce time separated electrical signals representative of the object transit time, a selectively adjustable signal generator for providing a signal representative of the spacing between the sensing devices and the rotational axis of said object, a third sensing device associated with said moving object for generating a signal for each cycle of the moving object, a velocity computer connected to said third sensing device and to said signal generator for producing velocity information signals as determined by the outputs thereof, an output computer connected to said velocity computer for receiving said velocity information signals, said output computer being further connected to a signal generator associated with said sensing devices for receiving angular information signals representative of the angular relationship of said sensing devices, servo means responsive to the output of said output computer for adjusting the angular relationship of said sensing devices to maintain a selected characteristic of said output within a predetermined range of values, and indicating means responsive to the output of said output computer for providing indications of the track position of said rotating object relative to said reference plane.

10. An electronic circuit in accordance with claim 9 wherein said third sensing device comprises a magnetic member fixedly positioned relative to said object for rotation therewith and magnetic pickup means operatively associated with said magnetic member such that a signal pulse is generated once each revolution of the rotating member when the magnetic member passes in close proximity to said pickup means.

11. An electronic circuit for providing indications of the track position of a rotating aerodynamic object comprising a pair of spaced sensing devices positioned to have their associated radiant energy beams interrupted by said moving object and adapted to produce time separated electrical signals representative of the transit time of the object with respect to said sensing devices, a third sensing device associated with said rotating aerodynamic object for generating a signal frequency directly proportional to the angular velocity of said rotating aerodynamic object, a velocity computer connected to said third sensing device for producing velocity information signals, an output computer connected to said velocity computer for receiving said velocity information signals, said output computer being further connected to a signal generator associated with said sensing devices for receiving angular information signals representative of the angular relationship of said sensing devices, servo means connected to said output computer for varying said angular relationship in a desired manner, and storage means and indicating means connected to said output computer for receiving data therefrom indicative of the track position of said rotating object.

12. An electronic circuit in accordance with claim 11 wherein said velocity computer comprises capacitance means adapted to be charged to a potential proportional to the radial distance from the pair of spaced sensing devices to the rotational axis of said object, multi-vibrator means responsive to the object velocity for metering the discharge of said capacitance means, and amplifier means controlled by the discharge of the capacitor for providing output signals proportional to the velocity of the rotating object.

13. A system for determining the spatial distance between a reference plane and each of a plurality of rotating objects comprising angularly related electro-optical sensing devices for receiving a plurality of radiant energy beams positioned in the path of rotating objects so as to be interrupted thereby, said angularly related electro-optical sensing devices being responsive to the beam interruptions for producing temporally spaced signals in accordance therewith; a signal generator associated with said rotating objects for producing reference signals having a frequency corresponding to the rotational speed of said objects; a computing circuit connected to said sensing devices and said signal generator for providing spatial distance information data as determined by said temporally spaced signals, said reference signals, and the angular relationship of said sensing devices; servo means connected to said computing circuit and said sensing device for varying the angular relationship of the sensing devices, and storage and indicating means connected to said computer circuit and responsive to said spatial distance information data to provide indications thereof.

14. A system for determining the spatial distance between a reference plane and each of a plurality of rotating objects comprising angularly related electro-optical sensing devices for receiving a plurality of radiant energy beams positioned in the path of rotating objects so as to be interrupted thereby, said angularly related electro-optical sensing devices being responsive to the beam interruptions for producing temporally spaced signals in accordance therewith, a signal generator associated with said rotating objects for producing reference signals having a frequency corresponding to the rotational speed of said objects, a computing circuit connected to said sensing devices and said signal generator for providing spatial distance information data as determined by said temporally spaced signals, said reference signals, and the angular relationship of said sensing devices, servo means connected to said computing circuit and said sensing devices for varying the angular relationship of the sensing devices in accordance with said information data, and means connected to said computing means for providing indications of said spatial distance information data.

15. A system for determining the spatial distance between a reference plane and each of a plurality of rotating objects comprising a plurality of angularly related sensing devices positioned to have their associated radiant energy beams interrupted by said rotating objects for producing parallax interval data in accordance with the rotation of said objects by said sensing devices, a signal generator associated with said rotating objects for producing reference signals having a frequency corresponding to the rotational speed of said objects, a computing circuit connected to said sensing devices and said signal generator for providing spatial distance information data as determined by said parallax interval data, said reference signals, and the angular relationship of said sensing devices, servo means connected to said computing circuit and said sensing devices for varying the angular relationship of the sensing devices in accordance with said information data, and indicating means connected to said computing circuit and responsive to the output thereof to provide indications of the distance between a reference plane and each of said plurality of rotating objects.

16. A system for determining the relative angles between adjacent ones of a plurality of rotating aerodynamic objects comprising a pair of electro-optical sensing devices each defining a radiant energy beam positioned in the path of the rotating objects so as to be interrupted thereby, a said pair of electro-optical sensing devices being responsive to the beam interruptions to produce electrical signals, said sensing devices being spaced such that one of said beams is interrupted by one of said objects and the second beam subsequently is interrupted by adjacent one of said objects to produce a pair of time spaced signals, a signal generator associated with said rotating objects for producing reference signals having a frequency corresponding to the rotational speed of said objects, a computing circuit connected to said sensing devices and said signal generator for providing relative angle information data as determined by said time spaced signals, and said reference signals, servo means connected to said computing circuit and said sensing device for varying the angular relationship of the sensing devices in accordance with said relative angle information data, and indicating means connected to said computing circuit and responsive to the output thereof to provide indications of the relative angles between adjacent ones of said plurality of rotating objects.

17. A system for determining the relative angles between adjacent elements in a rotating system comprising a pair of sensing devices positioned to have their associated radiant energy beams interrupted by said rotating elements and responsive thereto, for producing temporally spaced signals, said sensing devices being spaced such that a signal is produced in one device by one of said rotating objects and subsequently a signal is produced in the other device by an adjacent one of said objects, a signal generator for producing reference signals having a frequency corresponding to the rotational speed of said objects, a computing circuit connected to said sensing devices and said signal generator for providing relative angle information data determined by said temporally spaced signals, and said reference signals, servo means connected to said computing circuit and said sensing device for varying the angular relationship of the sensing devices in accordance with said relative angle information data, and indicating means connected to said computing means for providing an indication of said relative angle information data.

18. Apparatus for determining the dynamic lag of objects in a rotating system comprising radiant energy reflecting means secured to said rotating system for rotation with said object, a first radiant energy beam adapted to impinge upon said reflecting means at least once during each revolution of the rotating system, a first electronic optical sensing device adapted to produce an electrical signal upon receipt of the reflection of said first radiant energy beam from said reflecting means, a second beam of radiant energy adapted to be interrupted by the object in the rotating system, a second electro-optical sensing device responsive to the interruptions of the second beam by said object to produce electrical signals in accordance therewith, a signal generator associated with said rotating system and adapted to produce reference signals having a frequency representative of the rotational speed of said rotating system, an electronic circuit including computing means connected to the first and second sensing devices and to said signal generator for producing lag information data signals as determined by the time period between the electrical signals from the first and second sensing devices, and with the velocity of said rotating system, and storage and indicating means responsive to said lag information data for producing indications of the dynamic lag of said object.

19. Apparatus for determining the dynamic lag of an aerodynamic member in a rotating system comprising signal generator means for producing an electrical signal for each revolution of the rotating system, a first sensing device adapted to produce a first electrical pulse in response to each revolution of the rotating system, a second sensing device for receiving a beam of radiant energy, said second sensing device being positioned to have said radiant energy beam interrupted by the aerodynamic member in the rotating system and adapted to respond to the interruptions of the beam by said member to produce a second electrical pulse in accordance therewith, an electronic circuit including computing means connected to said signal generator means and said first and said second sensing devices for producing lag information data signals directly proportional to the time period between the electrical pulses and the frequency of the electrical signals, and storage and indicating means responsive to said lag information data for producing indications of the dynamic lag of said object.

References Cited in the file of this patent

UNITED STATES PATENTS

| | | |
|---|---|---|
| 1,877,713 | Beck | Sept. 13, 1932 |
| 2,444,235 | Walker | June 29, 1948 |
| 2,455,053 | Flint | Nov. 30, 1948 |
| 2,490,899 | Cohen | Dec. 13, 1949 |
| 2,653,309 | Hausz | Sept. 22, 1953 |
| 2,769,492 | Ostergren et al. | Nov. 6, 1956 |
| 2,770,798 | Roth | Nov. 13, 1956 |
| 2,820,182 | Martin | Jan. 14, 1958 |
| 2,830,487 | Griffith | Apr. 15, 1958 |

FOREIGN PATENTS

| | | |
|---|---|---|
| 741,367 | Germany | Nov. 10, 1943 |

UNITED STATES PATENT OFFICE
CERTIFICATE OF CORRECTION

Patent No. 3,002,420                         October 3, 1961

Samuel P. Willits et al.

It is hereby certified that error appears in the above numbered patent requiring correction and that the said Letters Patent should read as corrected below.

Column 2, line 27, for "particularly" read -- particularity --; column 4, line 33, for "integral" read -- interval --; column 10, line 66, after "computation" insert a comma; column 17, line 62, the right-hand portion of the equation, for "$+\Delta S_{x+1} \Delta S_x$" read -- $+\Delta S_{x+1} - \Delta S_x$ --; column 19, line 3, before "effecting" insert -- for --; column 19, line 65, for "5" read -- (5) --.

Signed and sealed this 24th day of April 1962.

(SEAL)
Attest:

ESTON G. JOHNSON
Attesting Officer

DAVID L. LADD
Commissioner of Patents